United States Patent [19]

Kaeppeli

[11] 3,957,767
[45] May 18, 1976

[54] BASIC STYRYL DYES FREE FROM SULPHONIC ACID GROUPS, THEIR PRODUCTION AND USE

[75] Inventor: Viktor Kaeppeli, Allschwil, Basel-Land, Switzerland

[73] Assignee: Sandoz Ltd., Basel, Switzerland

[22] Filed: June 13, 1974

[21] Appl. No.: 479,121

Related U.S. Application Data

[63] Continuation of Ser. No. 215,195, Jan. 3, 1972, abandoned.

[30] Foreign Application Priority Data

Jan. 8, 1971 Switzerland............................ 246/71

[52] U.S. Cl............................ 260/240.9; 260/240 D; 260/326.12 R; 8/177 AB
[51] Int. Cl.²....................................... C07D 209/04
[58] Field of Search................ 260/240.9, 326.12 R, 260/240 D

[56] References Cited
UNITED STATES PATENTS

| | | | |
|---|---|---|---|
| 2,230,789 | 2/1941 | Winter............................. | 260/240.9 |
| 2,242,474 | 5/1941 | Kochendoerfer................ | 260/240.9 |
| 2,350,393 | 6/1944 | Eistert et al. .................... | 260/240.9 |
| 3,346,571 | 10/1967 | Spatz et al. ................. | 260/326.12 R |
| 3,769,279 | 10/1973 | Kuhlthau et al. ............... | 260/240 G |

FOREIGN PATENTS OR APPLICATIONS

2,013,731 4/1970 France............................ 260/240.9

*Primary Examiner*—Arthur P. Demers
*Attorney, Agent, or Firm*—Gerald D. Sharkin; Richard E. Vila; Thomas C. Doyle

[57] ABSTRACT

Novel basic, styryl dyes containing no sulphonic acid groups and of formula

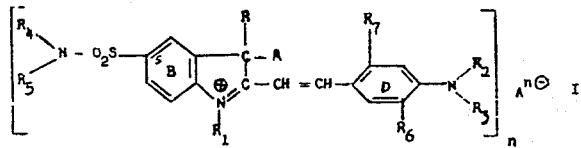

in which the radicals R, which may be the same or different, signify unsubstituted or substituted hydrocarbon radicals,
$R_1$ signifies an unsubstituted or substituted alkyl radical,
either
i. $R_6$ signifies a hydrogen atom,
$R_2$ signifies an unsubstituted alkyl radical or an alkyl radical substituted by one or more halogen atoms or cyano, aryl or alkoxy radicals,
and
$R_3$ signifies an unsubstituted alkyl radical, an alkyl radical substituted by one or more halogen atoms or cyano, aryl or alkoxy radicals, an unsubstituted aryl radical or an aryl radical substituted by one or more halogen atoms or alkyl alloxy or cyano radicals.
ii. $R_6$ signifies a hydrogen atom, and $R_2$ and $R_3$ together with the nitrogen atom to which they are attached signify a saturated or partially saturated, heterocyclic ring of 5 to 7 ring members,
or iii. $R_2$ signifies an unsubstituted alkyl radical or an alkyl radical substituted by one or more halogen atoms or cyano, aryl or alkoxy radicals, and $R_3$ and $R_6$, together with the nitrogen atom and carbon atom to which they are attached and the carbon to which the nitrogen atom is attached, signify a saturated or partially saturated, heterocyclic ring of 5 to 7 ring members,
x. $R_4$ signifies a hydrogen atom or an unsubstituted or substituted alkyl radical, and $R_5$ signifies an unsubstituted or substituted alkyl or aryl radical,
or y. $R_4$ and $R_5$, together with the nitrogen atom to which they are attached, signify a saturated or partially saturated, heterocyclic ring of 5 to 7 ring members,
$R_7$ signifies a hydrogen or halogen atom, or an unsubstituted or substituted alkyl radical,
$A^{n-}$ signifies an anion,
and the rings B and D may optionally be further substituted by one or more non-water-solubilizing substituents.

The dyes are useful for dyeing polyacrylonitrile, acrylonitrile copolymer, synthetic polyamide and polyester fibres, modified by the introduction of acid groups, plastic materials, synthetic and natural resins, leather and paper.

3 Claims, No Drawings

BASIC STYRYL DYES FREE FROM SULPHONIC ACID GROUPS, THEIR PRODUCTION AND USE

This is a continuation, of application Ser. No. 215,195 filed Jan. 3, 1972, and now abandoned.

This invention relates to basic, styryl dyes, which contain no sulphonic acid groups.

More particularly, this invention provides basic, styryl dyes containing no sulphonic acid groups and of formula I,

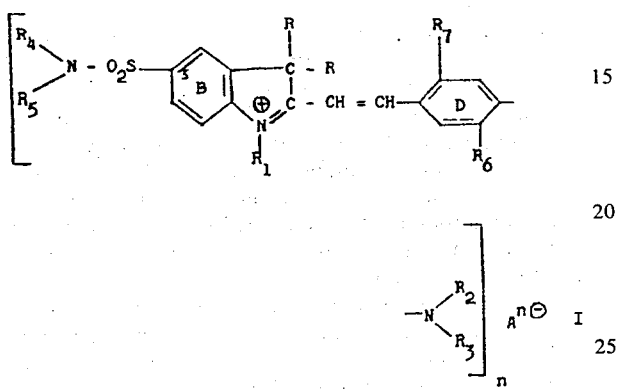

in which the radicals R, which may be the same or different, signify unsubstituted or substituted hydrocarbon radicals, $R_1$ signifies an unsubstituted or substituted alkyl radical, either i. $R_6$ signifies a hydrogen atom, $R_2$ signifies an unsubstituted alkyl radical or an alkyl radical substituted by one or more halogen atoms or cyano, aryl or alkoxy radicals, and $R_3$ signifies an unsubstituted alkyl radical, an alkyl radical substituted by one or more halogen atoms or cyano, aryl or alkoxy radicals, an unsubstituted aryl radical or an aryl radical substituted by one or more halogen atoms or alkyl, alkoxy or cyano radicals, ii. $R_6$ signifies a hydrogen atom, and $R_2$ and $R_3$ together with the nitrogen atom to which they are attached signify a saturated or partially saturated, heterocyclic ring of 5 to 7 ring members, iii. $R_2$ signifies an unsubstituted alkyl radical or an alkyl radical substituted by one or more halogen atoms or cyano, aryl or alkoxy radicals, and $R_3$ and $R_6$, together with the nitrogen atom and carbon atom to which they are attached and the carbon to which the nitrogen atom is attached, signify a saturated or partially saturated, heterocyclic ring of 5 to 7 ring members, either x. $R_4$ signifies a hydrogen atom or an unsubstituted or substituted alkyl radical, and $R_5$ signifies an unsubstituted or substituted alkyl or aryl radical, or y. $R_4$ and $R_5$, together with the nitrogen atom to which they are attached, signify a saturated or partially saturated heterocyclic ring of 5 to 7 ring members, $R_7$ signifies a hydrogen or halogen atom, or an unsubstituted or substituted alkyl radical, $A^{n-}$ signifies an anion, $n$ signifies 1, 2 or 3, and the rings B and D may optionally be further substituted by one or more non-water-solubilising substituents.

Suitable hydrocarbon radicals for R in formula I, include unsubstituted and substituted alkyl, cycloalkyl of 5 to 7 ring carbon atoms and aryl radicals, for example a cyclohexyl, alkylcyclohexyl or phenyl radical.

Where two substituents in formula I combine with adjacent atoms to form a heterocyclic ring, suitable heterocyclic rings include pyrrolidine, piperazine, morpholine, aziridine and piperidine rings.

As used herein, the term alkyl signifies a straight or branched chain alkyl radical of 1 to 12, suitably 1 to 6 and preferably 1 to 4 carbon atoms. Suitable substituted alkyl radicals include alkyl radicals substituted by one or more halogen atoms, or hydroxyl, cyano or aryl radicals. Preferred aryl substituted alkyl radicals, i.e. aralkyl radicals include the benzyl radical. Suitable aryl radicals include the phenyl radical.

As used herein, the term alkoxy signifies an alkoxy radical of 1 to 6, preferably 1 to 3 carbon atoms.

As used herein, the term halogen signifies bromine, fluorine, iodine or, preferably, chlorine.

The anion $A^{n-}$ may suitably be an inorganic or organic anion, such as a halide, e.g. chloride, bromide or iodide, sulphate, disulphate, methylsulphate, aminosulphonate, perchlorate, carbonate, bicarbonate, phosphate, phosphorus molybdate, phosphorus tungstate, phosphorus tungstic molybdate, benzenesulphonate, naphthalene, sulphonate, 4-chlorobenzenesulphonate, oxalate, maleate, malate, acetate, propionate, lactate, succinate, chloracetate, tartrate, methanesulphonate, or benzoate ion, or a complex anion, such as that of zinc chloride double salts.

Preferred dyes of formula I include those in which each radical R signifies a methyl radical, in particular those of formula Ia,

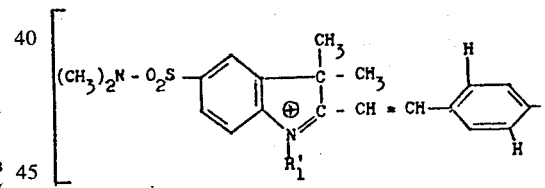

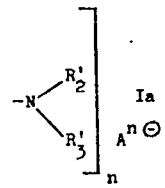

in which
$R_1'$ signifies a methyl or ethyl radical, $R_2'$ signifies an unsubstituted alkyl radical, an alkyl radical substituted by one or more halogen atoms or cyano groups, or a benzyl radical, and $R_3'$ signifies an unsubstituted alkyl radical, an alkyl radical substituted by one or more halogen atoms or cyano radicals, a benzyl radical, an unsubstituted aryl radical, or an aryl radical substituted by one or more halogen atoms or alkyl or alkoxy groups, and $A^{n-}$ and $n$ are as defined above.

The invention also provides processes for the production of the dyes of formula I, characterized by a. reacting a compound of formula II,

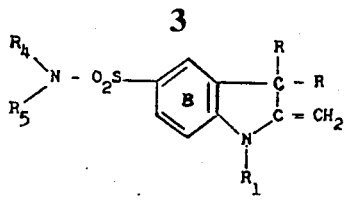

in which R, $R_1$, $R_4$, $R_5$ and ring B are as defined above, or a compound of formula III,

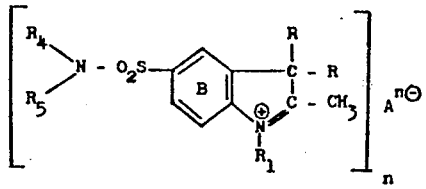

in which R, $R_1$, $R_4$, $R_5$, $A^{n-}$, n and ring B are as defined above, with a compound of formula IV,

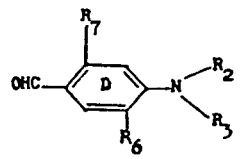

in which $R_2$, $R_3$, $R_6$, $R_7$ and ring D are as defined above, provided that, when a compound of formula II is employed, the reaction is either carried out in the presence of, or the product resulting from reaction between the compounds of formula II and IV is treated with, an acid of formuula V,

   V in which A signifies a radical convertible into an anion $A^{n-}$, as defined above, or b. quaternising a compound of formula VI,

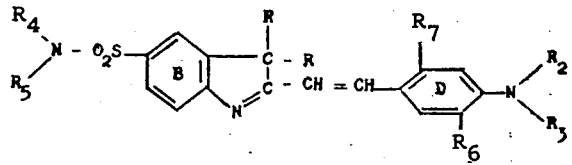

in which R, $R_2$, $R_3$, $R_4$, $R_5$, $R_6$, $R_7$ and rings A and B are with an appropriate quaternising agent, and, where required, converting the anion $A^{n-}$ in a resulting product into another anion $A^{n-}$.

Process (a) is suitably carried out at a temperature of from 50° to 130°C, preferably 70° to 100°C, and in the presence of an organic solvent, e.g. acetic acid. Where a compound of formula II is reacted with a compound of formula IV in the presence of an acid of formula V, the latter may, if appropriate, e.g. when it is acetic acid, serve as the solvent. Alternatively, where the acid V is a mineral acid, the solvent may comprise a mixture of water and an organic solvent.

The quaternisation in process (b) may be carried out in conventional manner, for example in an inert solvent, in an aqueous suspension, or alternatively, and where appropriate, by employing an excess of the quaternising agent to provide a reaction medium. The process may, if necessary, be carried out at an elevated temperature and in a buffered medium, provided suitably by an organic acid and, if necessary, a base. Suitable quaternising agents include compounds of formula $R_1A$, in which $R_1$ and A are as defined above. Particular quaternising agents include alkyl halides, such as ethyl chloride, bromide or iodide, alkyl sulphates, such as dimethyl sulphate, benzyl chloride, acrylic amide hydrohalides, e.g. $CH_2=CH—CO—NH_2.HCl$, chloroacetic alkyl esters, β-chloropropionic acid amides, epoxides, such as ethylene oxide and propylene oxide, and epichlorohydrin.

Where required, the anion $A^{n-}$ in a resulting product may be converted into a different anion in conventional manner, for example by means of an ion exchanger, or by reaction with salts or acids, if necessary in more than one step, e.g. via the hydroxide or bicarbonate.

The resulting compounds of formula I may be isolated and purified using conventional techniques.

The compounds of formula II, III, IV, V and VI are either known or may be produced in conventional manner from available materials.

The dyes of the invention are suitable for the exhaust or pad dyeing and printing of polyacrylonitrile and acrylonitrile copolymer fibres in loose form, as yarn and in the various textile forms, and for dyeing the component of such fibres in blends, e.g. yarns and fabrics, with other fibres. They may also be used for exhaust and pad dyeing and printing synthetic polyamide and synthetic polyester fibres modified by the introduction of acid groups, such as those described in Belgian Pat. No. 706,104 and U.S. Pat. Nos. 3,018,272 and 3,379,723. The present dyes may also be used for dyeing leather and paper.

The dyes of the present invention have good solubility in organic solvents and are suitable for the coloration of plastic materials and synthetic and natural resins, in the presence or absence of solvents.

In exhaust dyeing, the dyes may suitably be applied from neutral or acid aqueous media, and at a temperature of from 60° to 100° C, or at a temperature above 100° C and under pressure. Level dyeings may be obtained without the assistance of retarders.

The dyes of the present invention may advantageously be used alone, in admixture, or in admixture with other basic, cationic dyes.

Dyeing with the dyes of the present invention, particularly on polyacrylonitrile and acrylonitrile copolymer fibres, generally results in level dyeings which have good fastness to light and wet treatments, such as washing, water, sea water, dry cleaning, crossdyeing and solvents, and also to sublimation, pleating and decatizing. The dyes are well soluble, particularly in water, and show good stability to salt and pH conditions. They reserve natural and synthetic polyamide fibres and their stability to lengthy dyeing times at the boil is noteworthy.

The dye of formula VII,

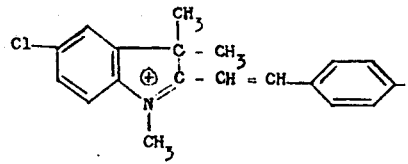

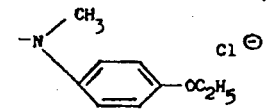

is described in United States Pat. No. 2,242,474 for the dyeing of polyacrylonitrile. The present dyes show improved light-fastness properties on polyacrylonitrile fibres, over this dye.

Furthermore, the dyes of the present invention are faster to light on acid modified, i.e. basic dyeable, polyester fibres, than the dye of formula VIII,

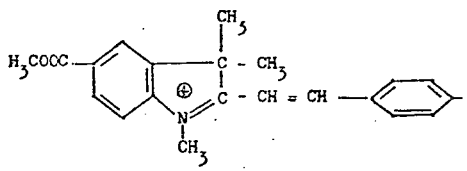

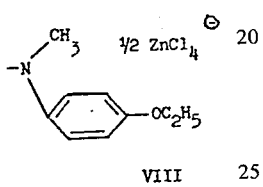

VIII which is described in United States Pat. No. 2,350,393.

The following Examples, in which all parts and percentages are by weight and all temperatures are in degrees Centigrade, illustrate the invention.

EXAMPLE 1 [process a)]

280 Parts of 5-N,N-dimethylsulphonamido-1,3,3-trimethyl-2-methylene indoline are stirred into 275 parts of acetic acid, and 216 parts of the aldehyde of the formula XI,

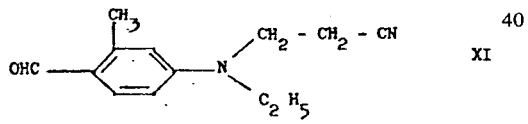

XI are introduced into the solution. The violet-coloured mixture is raised to 50°–55° and stirred at this temperature for 3 hours. Over the course of the next hour, the reaction mixture is added to a solution of 300 parts of common salt and 2500 parts of water. Stirring is continued for 2 hours while the dye formed, which is of the formula XII,

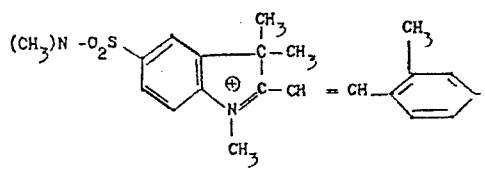

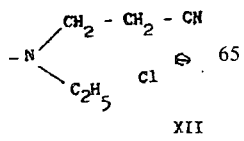

XII settles out. It is isolated by filtration and washed with a little brine. This water-soluble dye gives dyeings of red-violet shade on polyacrylonitrile and acrylonitrile copolymer fibres, which have good light and wet fastness properties.

EXAMPLE 2 [process a)]

To a solution of 280 parts of 5-N,N-dimethylsulphonamido-1,3,3,-trimethyl-2-methylene indoline in 350 parts of acetic acid, are added 241 parts of the aldehyde of the formula XIII,

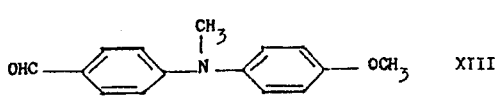

XIII

The blue-violet mixture is raised to 80°–90° and reacted for 2 hours at this temperature with stirring. The reaction mixture is diluted with 2500 parts of water, and 250 parts of common salt and 75 parts of zinc chloride are then added to precipitate the dye of the formula XIV,

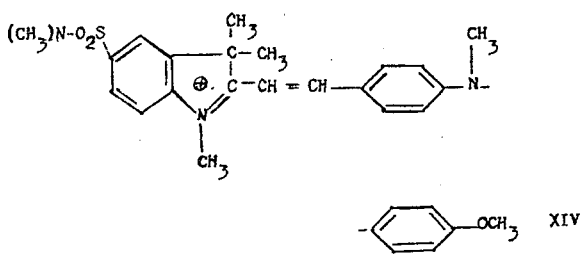

XIV

The mixture with the precipitated dye is stirred for a further 2 hours, after which the dye is filtered and washed with brine. The resulting dye dissolves in water and gives dyeings of violent shade on polyacrylonitrile and acrylonitrile copolymer fibres, which show good light and wet fastness.

The structural composition of further dyes is shown in Table T below. They are produced by the procedure of Example 1 or 2 and are of the formula IX,

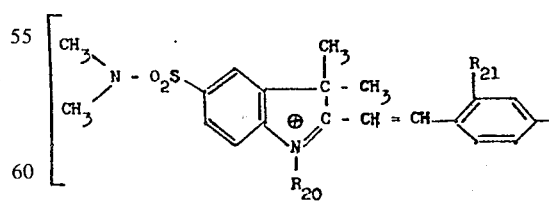
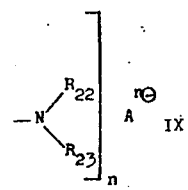

IX where $R_{20}$, $R_{21}$, $R_{22}$ and $R_{23}$ have the significance indicated in the table and, $A^{n-}$ and $n$ are as defined above, $A^{n-}$ may in particular be any of the specific anions hereinbefore mentioned.

TABLE T

| Example No. | $R_{20}$ | $R_{21}$ | $R_{22}$ | $R_{23}$ | Shade of dyeing on polyacrylonitrile fiber |
|---|---|---|---|---|---|
| 3 | —$CH_3$ | H | —$CH_3$ | —$CH_3$ | bluish red |
| 4 | " | H | —$C_2H_5$ | —$C_2H_5$ | red-violet |
| 5 | " | H | —$C_3H_7$ | —$C_3H_7$ | " |
| 6 | " | H | —$C_4H_9$ | —$C_4H_9$ | " |
| 7 | " | H | —$C_2H_4Cl$ | —$CH_3$ | " |
| 8 | " | H | —$C_2H_4Cl$ | —$C_2H_5$ | " |
| 9 | " | H | —$C_2H_4$—CH | —$CH_3$ | bluish red |
| 10 | " | H | —$C_2H_4$—CH | —$C_2H_5$ | " |
| 11 | " | H | —$C_2H_4$—CH | —$C_2H_4cN$ | " |
| 12 | " | H | —$C_2H_4Cl$ | —$C_2H_4Cl$ | red-violet |
| 13 | " | H | —$CH_2C_6H_5$ | —$CH_3$ | bluish red |
| 14 | " | H | —$CH_2$—$C_6H_5$ | —$C_2H_5$ | " |
| 15 | —$CH_3$ | H | —$CH_2$—$C_6H_5$ | —$CH_2$—$C_6H_5$ | bluish red |
| 16 | " | H | —$CH_2$—$C_6H_4$—Cl | —$C_2H_5$ | " |
| 17 | " | H | —$CH_2$—CH—CN | —$C_2H_5$ | " |
| | | | $CH_3$ | | |
| 18 | " | H | —$CH_3$ | —$C_6H_5$ | violet |
| 19 | " | H | —$C_2H_5$ | —$C_6H_5$ | " |
| 20 | " | H | —$CH_3$ | -p-$C_6H_4$—$CH_3$ | " |
| 21 | " | H | —$C_2H_5$ | -p-$C_6H_4$—$CH_3$ | " |
| 22 | " | H | —$CH_3$ | -p-$C_6H_4$—Cl | red-violet |
| 23 | " | H | —$C_2H_5$ | -p-$C_6H_4$—Cl | " |
| 24 | " | H | —$CH_3$ | -p-$C_6H_4$—CN | " |
| 25$^c$ | " | H | —$CH_3$ | -p-$C_6H_4$—$OC_2H_5$ | violet |
| 26 | " | H | —$C_2H_5$ | -p-$C_6H_4$—$OC_2H_5$ | " |
| 27 | " | H | —$C_2H_5$ | -p-$C_6H_4$—$OCH_3$ | " |
| 28 | " | H | —$CH_2$—$C_6H_5$ | —$C_2H_4CN$ | bluish red |
| 29$^d$ | " | —$CH_3$ | —$CH_3$ | —$CH_3$ | red-violet |
| 30 | " | " | —$C_2H_5$ | —$C_2H_5$ | " |
| 31 | " | " | —$C_2H_4Cl$ | —$C_2H_5$ | " |
| 32 | " | " | —$C_2H_4CN$ | —$CH_3$ | " |
| 33 | " | " | —$C_2H_4CN$ | —$C_2H_4$—CN | " |
| 34 | " | " | —$C_2H_4Cl$ | —$C_2H_4Cl$ | " |
| 35 | " | " | —$CH_2$—$C_6H_5$ | —$CH_3$ | " |
| 36 | " | " | —$CH_2$—$C_6H_5$ | —$C_2H_5$ | " |
| 37 | " | " | —$CH_2$—$C_6H_5$ | —$C_2H_4CN$ | " |
| 38 | " | " | —$CH_2$—$C_6H_5$ | —$CH_2$—$C_6H_5$ | " |
| 39 | —$CH_3$ | —$CH_3$ | —$CH_3$ | —$C_6H_5$ | violet |
| 40 | " | " | —$C_2H_5$ | —$C_6H_5$ | " |
| 41 | " | " | —$CH_3$ | -p-$C_6H_4$—Cl | " |
| 42 | " | " | —$CH_3$ | -p-$C_6H_4$—$CH_3$ | " |
| 43 | " | " | —$CH_3$ | -p-$C_6H_4$—$OCH_3$ | " |
| 44 | " | " | —$CH_3$ | -p-$C_6H_4$—$OC_2H_5$ | " |
| 45 | " | " | —$C_2H_5$ | -p-$C_6H_4$—$OCH_3$ | " |
| 46 | " | " | —$C_2H_5$ | -p-$C_6H_4$—$OC_2H_5$ | " |
| 47 | " | " | —$C_2H_5$ | -p-$C_6H_4$—$CH_3$ | " |
| 48 | —$C_2H_5$ | H | —$CH_3$ | —$CH_3$ | bluish red |
| 49 | " | " | —$C_2H_5$ | —$C_2H_5$ | red violet |
| 50 | " | H | —$C_2H_4Cl$ | —$C_2H_5$ | " |
| 51 | " | H | —$C_2H_4CN$ | —$CH_3$ | bluish-red |
| 52 | " | H | —$C_2H_4CN$ | —$C_2H_5$ | " |
| 53 | " | H | —$C_2H_4CN$ | —$C_2H_4CN$ | " |
| 54 | " | H | —$C_2H_4Cl$ | —$C_2H_4Cl$ | " |
| 55 | " | H | —$CH_2$—$C_6H_5$ | —$C_2H_5$ | " |
| 56 | " | H | —$CH_2$—$C_6H_5$ | —$CH_2$—$C_6H_5$ | " |
| 57 | " | H | —$CH_2$—$C_6H_5$ | —$C_2H_4$—CN | " |
| 58 | —$C_2H_5$ | H | —$CH_3$ | —$C_6H_5$ | violet |
| 59 | " | H | —$C_2H_5$ | —$C_6H_5$ | " |
| 60 | " | H | —$CH_3$ | -p-$C_6H_4$—$CH_3$ | " |
| 61 | " | H | —$C_2H_5$ | -p-$C_6H_4$— $CH_3$ | " |
| 62 | " | H | —$CH_3$ | -p-$C_6H_4$— Cl | red-violet |
| 63 | —$C_2H_5$ | H | —$C_2H_5$ | -p-$C_6H_4$—Cl | red-violet |
| 64 | " | H | —$CH_3$ | -p-$C_6H_4$—$OCH_3$ | violet |
| 65 | " | H | —$C_2H_5$ | -p-$C_6H_4$—$OCH_3$ | " |
| 66 | " | H | —$CH_3$ | -p-$C_6H_4$—$OC_2H_5$ | " |
| 67 | " | H | —$C_2H_5$ | -p-$C_6H_4$—$OC_2H_5$ | " |
| 68 | —$CH_3$ | —$CH_3$ | —$C_2H_4$—CN | —$C_2H_5$ | red-violet | a : e.g. the dye of formula XV,

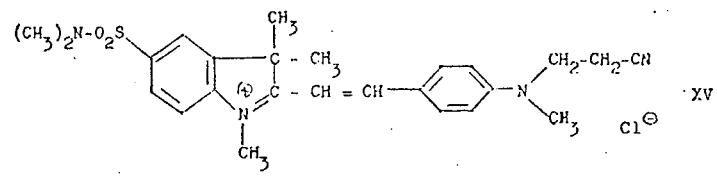

b : e.g. the dye of formula XVI,

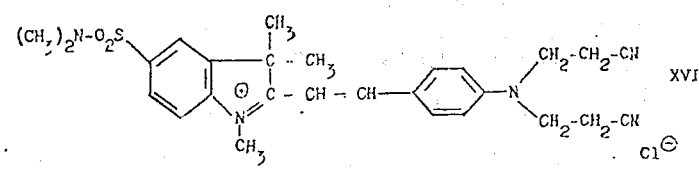

c : e.g. the dye of formula XVII,

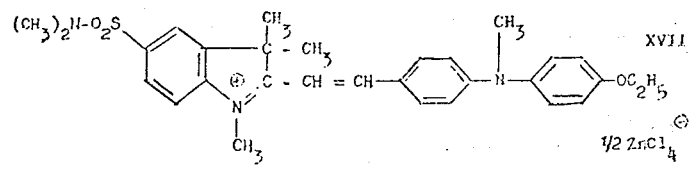

In the following Table $T_1$, the structural composition of further dyes is given. They can be produced in accordance with the procedure of Example 1 or 2 and are of formula X,

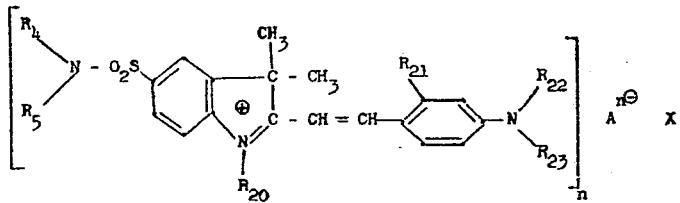

in which $R_4$, $R_5$ and $R_{20}$ to $R_{23}$ are as defined in the table, and $A^{n-}$ and $n$ are as defined above. $A^{n-}$ may, for example, be any of the specific anions hereinbefore mentioned.

are added at 40° to the paste, with stirring and boiling to dissolve. The solution is added to 7600 parts of distilled water, with the addition of 2 parts of glacial acetic acid.

100 parts of a fabric of polyacrylonitrile fibre are introduced into this dyebath at 60°, after pretreatment for 10–15 minutes at 60° in a bath of 8000 parts of water containing 2 parts of glacial acetic acid. The

TABLE $T_1$

| Exp No. | $R_4$ | $R_5$ | $R_{20}$ | $R_{21}$ | $R_{22}$ | $R_{23}$ | Shade of dyeing on polyacrylonitrile fiber |
|---|---|---|---|---|---|---|---|
| 69 | —$C_2H_5$ | —$C_2H_5$ | —$CH_3$ | H | —$CH_3$ | —$CH_3$ | red-violet |
| 70 | " | " | " | —$CH_3$ | —$CH_3$ | —$CH_3$ | reddish-violet |
| 71 | " | " | " | " | —$C_2H_4CN$ | —$C_2H_5$ | red-violet |
| 72 | " | " | " | H | —$CH_3$ | -p-$C_6H_4$—$OCH_3$ | violet |
| 73 | " | " | " | H | —$CH_3$ | -p-$C_6H_4$—$OC_2H_5$ | violet |
| 74 | " | " | " | H | —$C_2H_5$ | —$C_2H_5$ | red-violet |
| 75 | " | " | " | —$CH_3$ | —$C_2H_5$ | —$C_2H_5$ | reddish-violet |
| 76 | —$C_6H_5$ | —H | " | H | —$CH_3$ | —$CH_3$ | red-violet |
| 77 | " | H | " | H | —$C_2H_5$ | —$C_2H_5$ | red-violet |
| 78 | " | H | " | H | —$C_2H_4CN$ | —$CH_3$ | red-violet |
| 79 | " | H | " | H | —$C_2H_4CN$ | —$C_2H_5$ | red-violet |
| 80 | " | H | " | H | —$CH_3$ | -p-$C_6H_4$—$OCH_3$ | violet |
| 81 | " | H | " | H | —$CH_3$ | -p-$C_6H_4$—$OC_2H_5$ | violet |
| 82 | " | H | " | —$CH_3$ | —$CH_3$ | —$CH_3$ | red-violet |
| 83 | " | H | " | —$CH_3$ | —$C_2H_5$ | —$C_2H_5$ | violet |
| 84 | " | H | " | " | —$C_2H_4CN$ | —$C_2H_5$ | violet |
| 85 | " | H | " | " | —$C_2H_4Cl$ | —$C_2H_5$ | red-violet |
| 86 | —$C_2H_5$ | —$C_2H_5$ | " | " | —$C_2H_4Cl$ | —$C_2H_5$ | red-violet |
| 87 | " | " | " | H | —$C_2H_4CN$ | —$CH_3$ | red-violet |
| 88 | " | " | " | H | —$C_2H_4CN$ | —$C_2H_5$ | red-violet |
| 89 | " | " | " | H | —$C_2H_4CN$ | —$C_2H_4CN$ | red-violet |

EXAMPLE 90:

A mixture of 20 parts of the dye of Example 1 and 80 parts of dextrin is ground in a ball mill for 48 hours. One part of the resulting preparation is pasted with 1 part of 40% acetic acid and 400 parts of distilled water dyebath is raised to 100° over 30 minutes and held at the boil for 1 hour. On removal, the fabric is rinsed. A level red-violet dyeing is obtained which has good light and wet fastness properties.

What is claimed is:
1. A compound of the formula

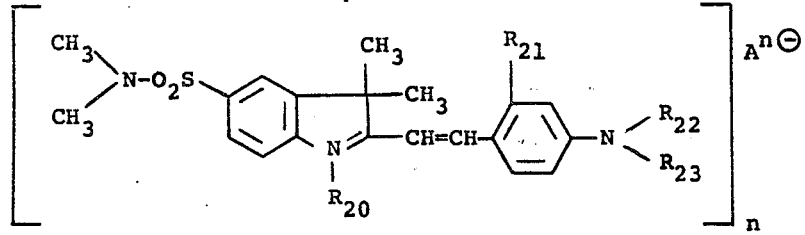

wherein
R$_{20}$ is methyl or ethyl,
R$_{21}$ is hydrogen or methyl,
R$_{22}$ is methyl or ethyl,
R$_{23}$ is phenyl monosubstituted in the para position by methyl, methoxy, ethoxy, chloro, or cyano,
A$^{n-}$ is an anion, and
$n$ is 1, 2 or 3.
2. A basic styryl dye according to claim 1, of formula,
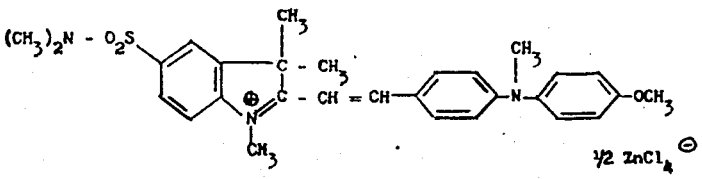
3. A basic, styryl dye according to claim 1, of formula
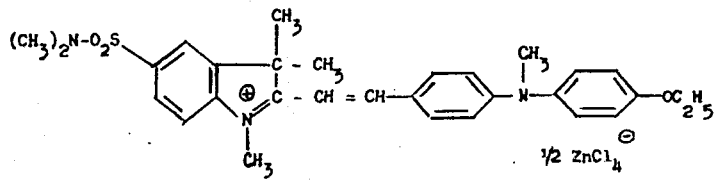
* * * * *